T. Harrison,
Mining Minerals.
N° 42,626. Patented May 3, 1864.

Witnesses.
Inventor
Thomas Harrison.

T. Harrison,
Mining Minerals.
N°42,626. Patented May 3, 1864.
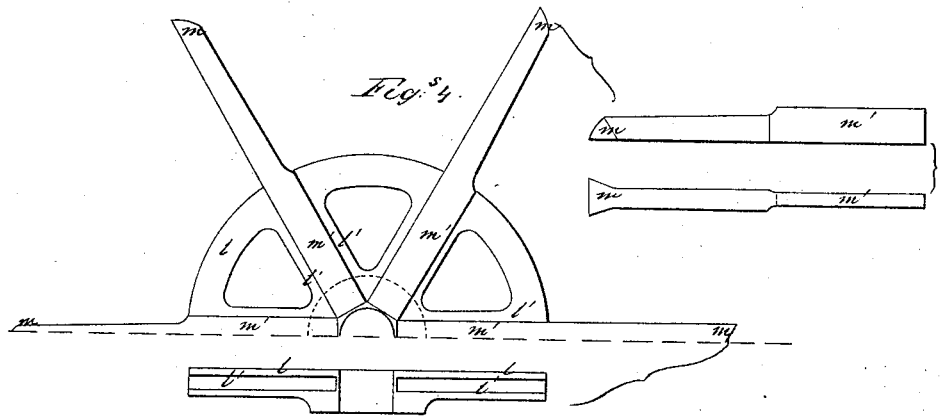
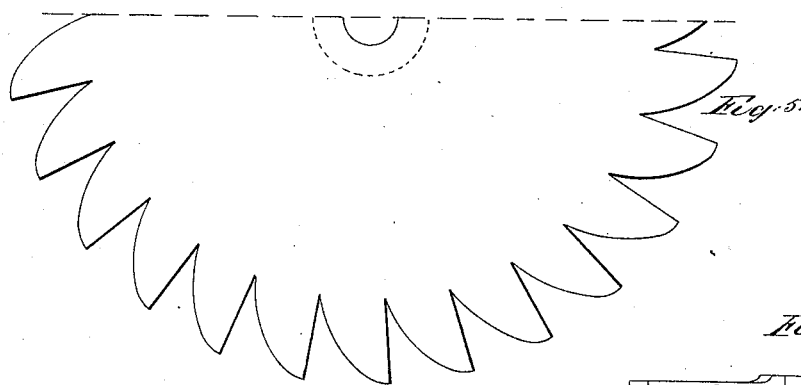
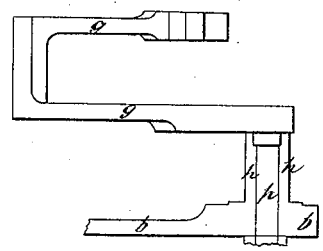
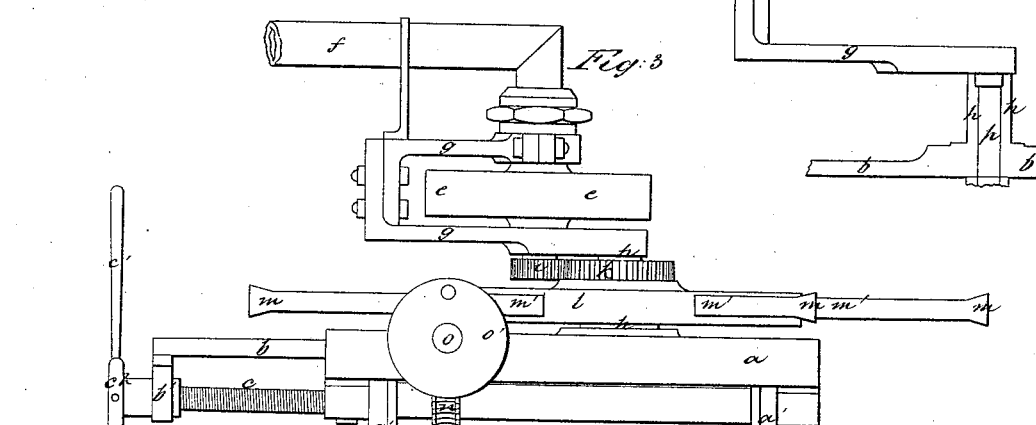
Inventor
Thomas Harrison

UNITED STATES PATENT OFFICE.

THOMAS HARRISON, OF TUDHOE, ENGLAND.

IMPROVEMENT IN MODE OF CUTTING COAL AND OTHER MINERALS.

Specification forming part of Letters Patent No. 42.626, dated May 3, 1864.

*To all whom it may concern:*

Be it known that I, THOMAS HARRISON, of Tudhoe, near Ferry Hill, in the county of Durham, England, mechanical engineer, a subject of the Queen of Great Britain, have invented or discovered new and useful Improvements in Machinery for Cutting Coal and other Minerals and Stones; and I, the said THOMAS HARRISON, do hereby declare the nature of the said invention and in what manner the same is to be performed to be particularly described and ascertained in and by the following statement thereof—that is to say:

This invention has for its object improvements in machinery for cutting coal and other minerals and stones. For this purpose I take a turbine of such dimensions as the occasion may require and mount it upon a suitable truck, trolley, or other carriage, and on the spindle or axis of the turbine I place a toothed pinion. On another spindle or axis, placed upon the same carriage, I put a toothed wheel in such manner as to work into and be driven by the pinion aforesaid. Upon the axis of the toothed wheel I place a circular revolving cutter, or a disk having a serrated edge like a circular saw, but stronger, or a hollow circular box or frame, into which I fix any required number of cutting-tools of a form suited for cutting the coal or other substance intended to be operated upon. The turbine wheel and pinion-frame and cutters are fixed upon a sliding bed in such manner that the whole may be moved simultaneously forward or backward by means of a lever, a screw, a rack and pinion, or by any other means, and thus the depth of the groove or cut which is to be excavated may be regulated at the will or pleasure of the operator.

The relative sizes of the toothed wheel and pinion must be such as to give the most suitable velocity to the cutters, and this will depend, in fact, upon the nature of the mineral or other substance operated upon.

In cutting longitudinal grooves the machinery is to be placed upon a rail or tram way, and must be moved forward as the work proceeds. In making vertical cuts the machinery must be mounted, so as to work upon slide-bars upward and downward, as desired.

The turbine may be put in motion by compressed air, water, or steam.

And in order that my said invention may be most fully understood and readily carried into effect, I will proceed to describe the drawings hereunto annexed.

Figure 1:
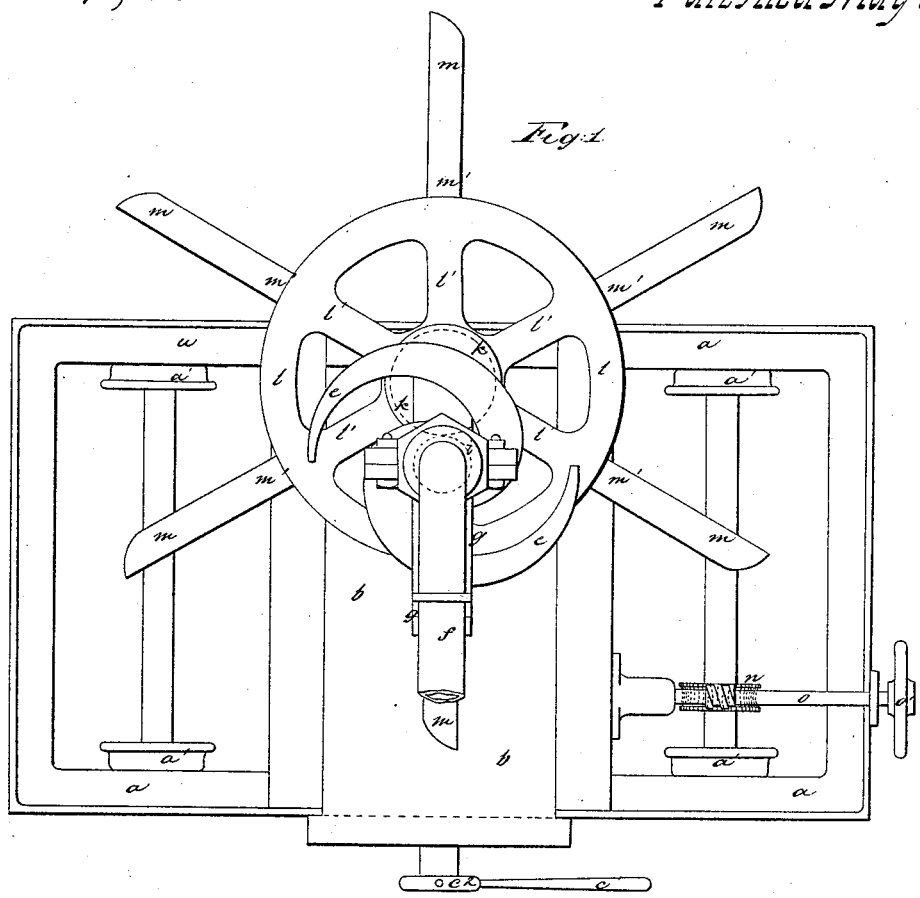
Figure 2:
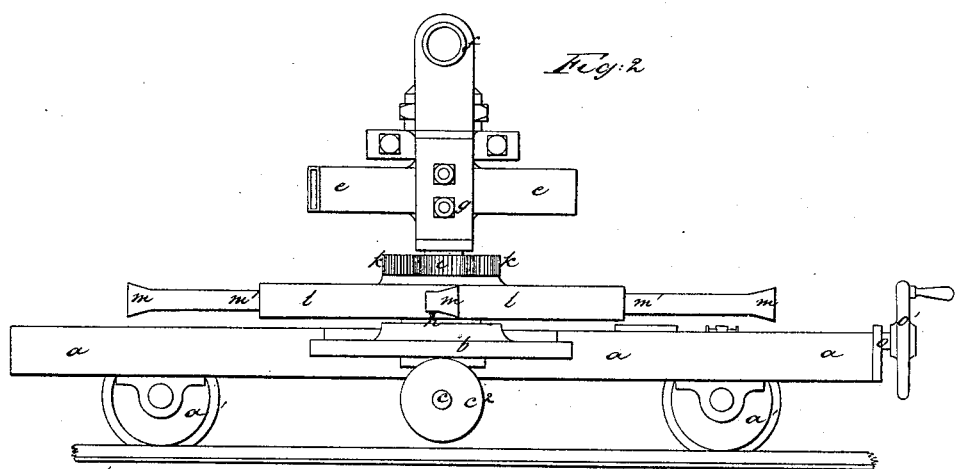

In the drawings, Figure 1 is a plan of a machine arranged according to my invention. Fig. 2 is a side view, and Fig. 3 an end view, of the same.

$a\ a$ is a truck, trolley, or carriage, mounted on the four flanged-wheels $a'\ a'$, and having guides upon it, in which the bed $b$ is able to slide to and fro in a direction across the carriage. This motion is conveniently given to it by means of a screw, $c$, which is mounted so as to be able to turn freely in the bearing $b'$, fixed to the bed $b$, but not to move longitudinally therein.

$d$ is a screw-nut fixed to the carriage $a$, and the screw $c$ passes through and works with it; hence when the screw $c$ is turned, which is done by a handspike, $c'$, placed in one or other of a series of holes in the head $c^2$ of the screw, the bed $b$ is caused to travel in its guides.

$e$ is a turbine, which is fed with compressed air, water, or steam by the pipe $f$. It is carried by the U-form frame $g$, which is fixed on the top of a stud-axis, $h$, formed or secured to the sliding bed $b$. On the lower end of the axis of the turbine, beneath the frame $g$, there is a pinion, $i$, gearing with and driving the toothed wheel $k$, which is fixed on the circular cutter box or frame $l$. A plan, and also a transverse section, of a portion of this cutter box or frame, together with its cutters $m$, are shown at Fig. 4. It will be seen that the cutters are made with tangs $m'$, and these enter sockets $l'$ in the cutter box or frame $l$, and are then secured by tap-screws, wedges, or otherwise. The toothed wheel $k$ and cutter box or frame $l$ are mounted so as to be able to revolve freely on the stud-axis $h$.

Fig. 5 is a plan of a portion of a circular revolving cutter or disk having a serrated edge like a circular saw, which I sometimes employ in place of the cutter box or frame $l$ and the cutters $m$. On the axis of one pair of the wheels, $a'$, a worm-wheel, $n$, is fixed, and this gears with a worm on the axis *o*. At the end of this axis is a hand-wheel, *o'*, by which it can be rotated, and by so doing the carriage is caused to travel forward as the work progresses.

Fig. 6 is a side view, partly in section, of the U-form frame *g*, together with a portion of the sliding bed *b* and the stud-axis *h*, to the upper end of which the frame *g* is secured by the bolt *p*.

In use the machine is mounted on horizontal or vertical rails or slides, along which, as the work progresses, it is made to traverse by turning the axis *o* by the hand-wheel at its end, and by the screw *c* the cutters are set to penetrate the coal, mineral, or stone to the depth required.

In cutting a vertical groove it is convenient to have a toothed wheel on the axis of the hinder wheels *a' a'*, and to provide a rack on the vertical slides for this to work into.

Having thus described the nature of my said invention and the manner of performing the same, I would have it understood that I do not confine myself to the exact details described, and shown in the drawings; but

What I claim is—

The combining a turbine with a truck, trolley, or other carriage, substantially as described, and the combining therewith rotating cutters, so arranged that the carriage can be caused to travel gradually forward as the work progresses, and the cutters set to cut a greater or less distance into the coal, mineral, or stone, as required, substantially as above described.

Witnesses: THOMAS HARRISON.
Jos. CARRICK,
W. DUNN, Jr.